United States Patent
Dong

(10) Patent No.: US 12,401,483 B2
(45) Date of Patent: Aug. 26, 2025

(54) METHOD AND DEVICE FOR BLOCK ACKNOWLEDGEMENT FEEDBACK OF DATA FRAMES

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 168 days.

(21) Appl. No.: 18/271,959

(22) PCT Filed: Jan. 12, 2021

(86) PCT No.: PCT/CN2021/071229
§ 371 (c)(1),
(2) Date: Jul. 12, 2023

(87) PCT Pub. No.: WO2022/150956
PCT Pub. Date: Jul. 21, 2022

(65) Prior Publication Data
US 2024/0072977 A1    Feb. 29, 2024

(51) Int. Cl.
*H04L 5/00*    (2006.01)
*H04L 1/00*    (2006.01)
(Continued)

(52) U.S. Cl.
CPC .......... *H04L 5/0055* (2013.01); *H04L 1/0057* (2013.01); *H04L 1/1642* (2013.01)

(58) Field of Classification Search
CPC ... H04L 1/1614; H04L 1/1621; H04L 5/0044; H04L 1/1642; H04L 5/0055; H04L 1/0057; H04W 80/02
See application file for complete search history.

(56) References Cited

U.S. PATENT DOCUMENTS 11,497,074 B2 * 11/2022 Patil .................. H04L 1/1867
11,533,132 B2 * 12/2022 Kneckt .............. H04L 1/1621
(Continued)

FOREIGN PATENT DOCUMENTS

CN    1989723 A    6/2007
CN    103095429 A    5/2013
(Continued)

OTHER PUBLICATIONS

State Intellectual Property Office of the People's Republic of China, Office Action and Search Report Issued in Application No. 2021800002429, Jul. 14, 2023, 14 pages.
(Continued)

*Primary Examiner* — Justin R Knapp
(74) *Attorney, Agent, or Firm* — Volpe Koenig

(57) ABSTRACT

A method for block acknowledgement feedback of data frames, a block acknowledgement apparatus, and a storage medium that can improve the feedback efficiency in a wireless communication network. The feedback efficiency is improved by: determining sequence numbers of to-be-transmitted data frames corresponding to a same traffic identifier in each of at least two links, where the at least two links include links between each of the at least two data transmitters and a same data receiver; and transmitting the to-be-transmitted data frames including the sequence numbers in each of the at least two links.

20 Claims, 6 Drawing Sheets

(51) Int. Cl.
*H04L 1/16* (2023.01)
*H04L 1/1607* (2023.01)

(56) References Cited

U.S. PATENT DOCUMENTS

| | | | |
|---|---|---|---|
| 11,750,329 B2* | 9/2023 | Chu | H04L 1/1685 370/329 |
| 11,984,984 B2* | 5/2024 | Kneckt | H04L 1/1614 |
| 2008/0212612 A1 | 9/2008 | Harkirat et al. | |
| 2017/0310446 A1 | 10/2017 | Asterjadhi et al. | |
| 2019/0045537 A1 | 2/2019 | Seok et al. | |
| 2022/0272777 A1* | 8/2022 | Guo | H04L 1/1896 |
| 2023/0011167 A1* | 1/2023 | Chitrakar | H04L 1/1874 |
| 2023/0117751 A1* | 4/2023 | Kneckt | H04W 80/02 370/329 |
| 2023/0254921 A1* | 8/2023 | Hencinski | H04L 1/1685 370/328 |

FOREIGN PATENT DOCUMENTS

| | | |
|---|---|---|
| CN | 106656429 A | 5/2017 |
| CN | 107613526 A | 1/2018 |
| CN | 107613569 A | 1/2018 |
| CN | 110999467 A | 4/2020 |
| CN | 112074020 A | 12/2020 |

OTHER PUBLICATIONS

ISA State Intellectual Property Office of the People's Republic of China, Written Opinion of the International Searching Authority Issued in Application No. PCT/CN2021/071229, Sep. 27, 2021, WIPO, 7 pages.

ISA State Intellectual Property Office of the People's Republic of China, International Search Report Issued in Application No. PCT/CN2021/071229, Sep. 27, 2021, WIPO, 4 pages.

European Patent Office, Extended European Search Report Issued in Application No. 21918175.7, Feb. 7, 2024, Germany, 8 pages.

* cited by examiner

```
┌─────────────────────────────────────┐
│ Sequentially determine, based on the preset value, a SN │
│ of each of the to-be-transmitted data frames in each of │─── 501
│       the at least two connections                      │
└─────────────────────────────────────┘
```

FIG. 5

```
┌─────────────────────────────────────┐
│ In response to receiving all target data frames         │
│ corresponding to a same task identifier by at least two │
│ connections, determine target BA frames for BA          │─── 601
│ feedback of the all the target data frames              │
└─────────────────────────────────────┘
                    │
                    ▼
┌─────────────────────────────────────┐
│ Feed back the target BA frames by one of the at least   │─── 602
│                two connections                          │
└─────────────────────────────────────┘
```

FIG. 6

```
┌─────────────────────────────────────┐
│ Receive a request frame for requesting an establishment │─── 701
│              of a BA mechanism                          │
└─────────────────────────────────────┘
                    │
                    ▼
┌─────────────────────────────────────┐
│ Determine, based on a buffer size in the request frame, a │
│ maximum value of SNs of the target data frames for BA    │─── 702
│                    feedback                               │
└─────────────────────────────────────┘
```

FIG. 7

METHOD AND DEVICE FOR BLOCK ACKNOWLEDGEMENT FEEDBACK OF DATA FRAMES

CROSS-REFERENCE TO RELATED APPLICATION

This application is a National Stage of International Application No. PCT/CN2021/071229, filed on Jan. 12, 2021, the contents of all of which are incorporated herein by reference in their entirety.

TECHNICAL FIELD

The present disclosure relates to the field of communication technologies, and in particular to a block acknowledgment method, and a block acknowledgement device.

BACKGROUND

Currently, to improve feedback efficiency, block acknowledgement (BA) can be used to provide feedback on the reception status of two or more data frames. The BA can be based on a multi-link device (MLD) level, where the MLD means that a physical device can communicate in multiple links. That is, data frames with the same traffic identifier (TID) can be transmitted in different links, and the BA feedback can be performed in one of the links.

SUMMARY

Embodiments of the present disclosure provide a block acknowledgment method, and a block acknowledgement device.

According to a first aspect of the embodiments of the present disclosure, a block acknowledgment (BA) method is provided, and the method is performed by at least two data transmitters, and includes:

determining sequence numbers (SNs) of to-be-transmitted data frames corresponding to a same traffic identifier (TID) in each of at least two links, where the at least two links include links between each of the at least two data transmitters and a same data receiver; and transmitting the to-be-transmitted data frames including the sequence numbers in each of the at least two links.

According to a second aspect of the embodiments of the present disclosure, a block acknowledgment method is provided, and the method is performed by a data receiver, and includes:

receiving all target data frames corresponding to a same traffic identifier by at least two links; determining target block acknowledgement frames for block acknowledgement feedback of all target data frames, where the at least two links include links between each of at least two data transmitters and the data receiver; and feeding back the target block acknowledgement frames by one of the at least two links.

According to a third aspect of the embodiments of the present disclosure, a block acknowledgement method is provided, the method includes:

determining, by at least two data transmitters, sequence numbers of to-be-transmitted data frames corresponding to a same traffic identifier in each of at least two links;

transmitting, by the at least two data transmitters, the to-be-transmitted data frames comprising the sequence numbers in each of the at least two links to a data receiver;

receiving by the data receiver, through the at least two links, all target data frames corresponding to the same traffic identifier from the at least two data transmitters;

determining, by the data receiver, target block acknowledgement frames for block acknowledgement feedback of all target data frames, wherein the at least two links comprise links between each of the at least two data transmitters and the data receiver; and feeding back, by the data receiver, the target block acknowledgement frames by one of the at least two links.

It will be understood that the above general description and the later detailed description are only exemplary and explanatory and do not limit the present disclosure.

BRIEF DESCRIPTION OF THE DRAWINGS

The accompanying drawings herein are incorporated into and form part of the specification, illustrate embodiments consistent with the present disclosure, and are used in conjunction with the specification to explain the principles of the present disclosure.

FIG. 5 is a schematic flowchart illustrating a block acknowledgement method according to still another exemplary embodiment of the present disclosure.

FIG. 6 is a schematic flowchart illustrating a block acknowledgement method according to still another exemplary embodiment of the present disclosure.

FIG. 7 is a schematic flowchart illustrating a block acknowledgement method according to still another exemplary embodiment of the present disclosure.

DETAILED DESCRIPTION OF THE EMBODIMENTS

Figure 1A:
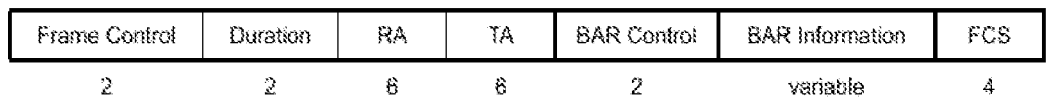
FIG. 1A is a structural schematic diagram illustrating a block acknowledgment frame according to an exemplary embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "the" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when," "upon," or "in response to determining."

The structure of the block acknowledgment (BA) frame specified in the current standard is shown in FIG. 1A and includes a frame control field, a duration field, a receiver address (RA) field, a transmitter address (TA) field, a block acknowledgement response (BAR) control field, and a frame check sequence (FCS) field.

Figure 1B:
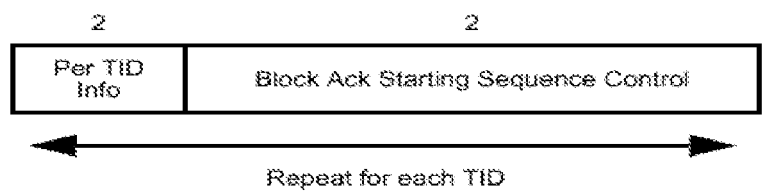
FIG. 1B is a structural schematic diagram illustrating a block acknowledgment response (BAR) information field in a block acknowledgment frame according to an exemplary embodiment of the present disclosure.
Figure 1C:
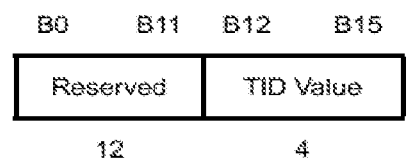
FIG. 1C is a structural schematic diagram illustrating a per traffic identifier information (Per TID Info) field according to an exemplary embodiment of the present disclosure.
Figure 1D:
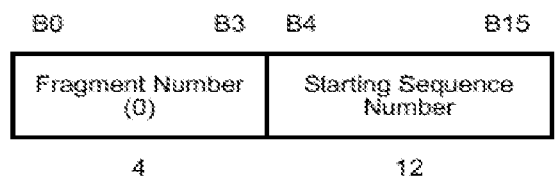
FIG. 1D is a structural schematic diagram illustrating a block acknowledgment (ACK) starting sequence control field according to an exemplary embodiment of the present disclosure.

The structure of the BAR information field in the BA frame is shown in FIG. 1B and includes a per traffic identifier information (Per TID Info) field and a block acknowledgment (ACK) starting sequence control field. The structure of the Per TID Info field is shown in FIG. 1C, and includes a reserved field and a TID field. The structure of the block ACK starting sequence control field is shown in FIG. 1D, and includes a fragment number field and a starting sequence number field.

Figure 1E:
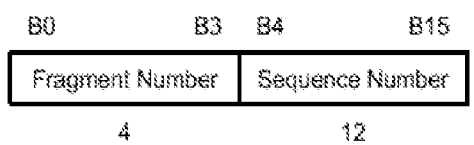
FIG. 1E is a structural schematic diagram illustrating a sequence number according to an exemplary embodiment of the present disclosure.

In addition, when the data transmitter transmits the data frames corresponding to the same TID, the data frames carry the sequence numbers (SNs), and the structure of the SN is shown in FIG. 1E, and includes a fragment number field and a sequence number field.

When the BA feedback is performed, BA frames include a starting sequence number (SSN), in some implementations, the setting of the starting sequence number (SSN) is for a single link, i.e., the setting of the SSN and the setting of the SN for each data frame cannot be applied to the MLD-level BA feedback.

The present disclosure provides a block acknowledgment (BA) method. The BA method is described below first from the data transmitter.

Figure 2:
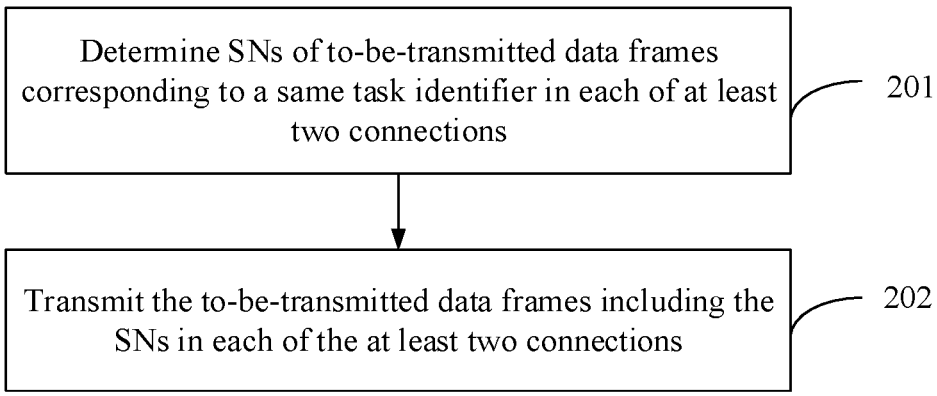
FIG. 2 is a schematic flowchart illustrating a block acknowledgement method according to an exemplary embodiment of the present disclosure.

Referring to FIG. 2, FIG. 2 is a schematic flowchart illustrating a BA method according to an exemplary embodiment of the present disclosure, the method can be applied to a group of data transmitters, which includes two or more data transmitters. The method includes the following steps 201 to 202.

At step 201, SNs of to-be-transmitted data frames corresponding to a same traffic identifier in each of at least two links are determined.

In embodiments of the present disclosure, the at least two links include links between each of the at least two data transmitters and a same data receiver. For each of the data transmitters, the data transmitter determines a SN of each of the to-be-transmitted data frames corresponding to the same TID in the link between the data transmitter and the data receiver. The to-be-transmitted data frames include, but are not limited to, to-be-transmitted MAC service data units (MSDUs) or aggregation MSDUs (A-MSDUs).

At step 202, the to-be-transmitted data frames including the SNs in each of the at least two links are transmitted.

The above embodiments may be performed independently or together with any of the other embodiments of the present disclosure, and the embodiments of the present disclosure are not limited hereto.

In embodiments of the present disclosure, the at least two data transmitters transmit the to-be-transmitted data frames including the SNs in each link to the data receiver.

In a possible example, the at least two data transmitters may continuously transmit the to-be-transmitted data frames including the SNs in each link at the same time.

In another possible example, the at least two data transmitters may continuously transmit the to-be-transmitted data frames including the SNs in the different links in separate times or at the same time.

In embodiments of the present disclosure, the number of to-be-transmitted data frames transmitted in each link may be the same or different, which is not limited by the present disclosure. For example, the number of to-be-transmitted data frames in a link 1 is four, the number of to-be-transmitted data frames in a link 2 is four or five, etc.

In the above embodiments, the at least two data transmitters may respectively determine the SN of each of the to-be-transmitted data frames corresponding to the same traffic identifier in each of at least two links, thereby transmit the to-be-transmitted data frames including the SNs in each of the at least two links, so that the data receiver determines target block acknowledgment frames to achieve block acknowledgment feedback based on MLD-level, and the feedback efficiency is improved.

Figure 3:
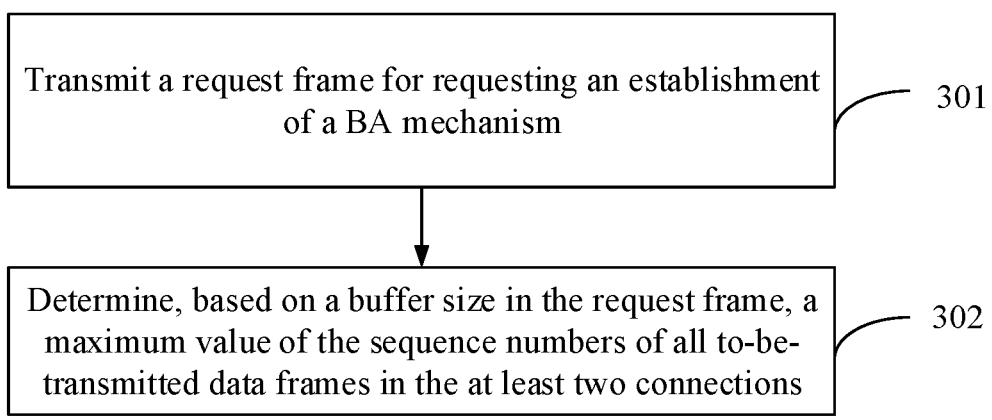
FIG. 3 is a schematic flowchart illustrating a block acknowledgement method according to another exemplary embodiment of the present disclosure.

In some optional embodiments, referring to FIG. 3, FIG. 3 is a schematic flowchart illustrating a BA method according to another exemplary embodiment of the present disclosure, and the method includes the following steps 301 to 302.

At step 301, a request frame for requesting an establishment of a BA mechanism is transmitted.

In embodiments of the present disclosure, the request frame includes, but is not limited to, an ADDBA request frame.

At step 302, based on a buffer size in the request frame, a maximum value of the sequence numbers of all to-be-transmitted data frames in the at least two links is determined.

The above embodiments may be performed independently or together with any of the other embodiments of the present disclosure, the embodiments of the present disclosure are not limited hereto. In the embodiments of the present disclosure, the at least two data transmitters may negotiate the buffer size with the data receiver by the request frame when the BA mechanism is established, and further, the maximum value of the SNs of all to-be-transmitted data frames in the at least two links established between each of the at least two data transmitters and the data receiver cannot exceed the buffer size.

In the above embodiments, the at least two data transmitters may, before determining the SNs of the to-be-transmitted data frames corresponding to the same traffic identifier in each of the at least two links, transmit the request frame for requesting an establishment of a BA mechanism, and determine, based on the buffer size in the request frame, a maximum value of the SNs of all to-be-transmitted data frames in the at least two links. The data receiver can determine the maximum value of the SNs of the received target data frames based on the buffer size in the request frame. In this way, the implementation is easy and the availability is high.

In some embodiments, all to-be-transmitted data frames in the at least two links between each of the at least two data transmitters and the same data receiver have one SSN, and a value of the SSN may be a preset value, where the preset value may be any integer, including but not limited to 0, 1, −1, etc., and the present disclosure is not limited thereto.

Figure 4:
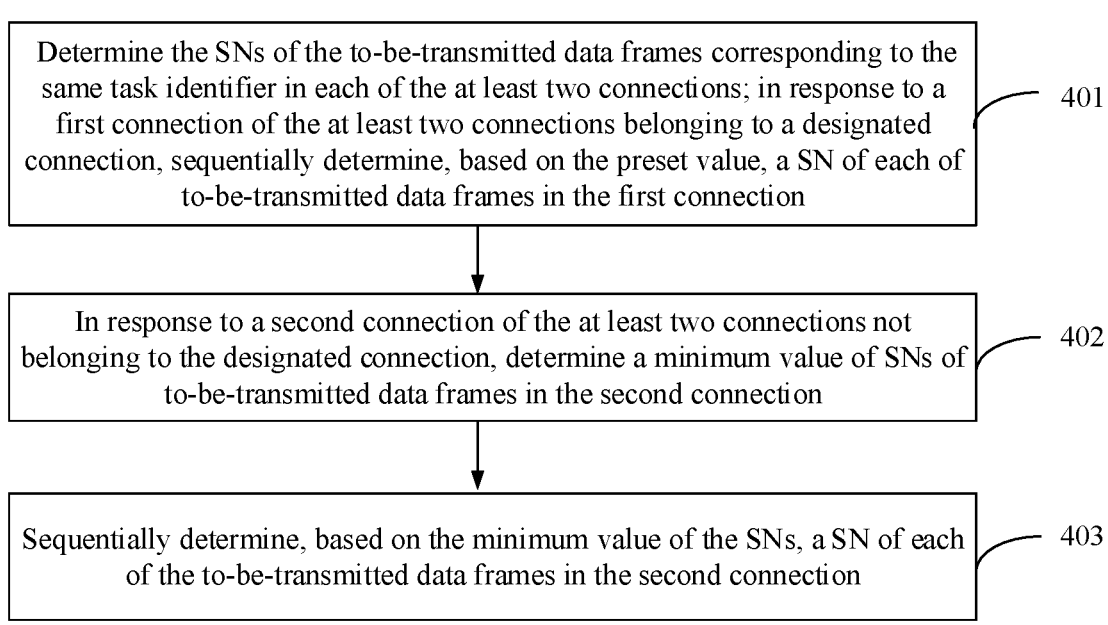
FIG. 4 is a schematic flowchart illustrating a block acknowledgement method according to yet another exemplary embodiment of the present disclosure.

Referring to FIG. 4, FIG. 4 is a schematic flowchart illustrating a block acknowledgement method according to yet another exemplary embodiment of the present disclosure, and the method includes the following steps 401 to 403.

At step 401, the SNs of the to-be-transmitted data frames corresponding to the same traffic identifier in each of the at least two links are determined; in response to a first link of the at least two links belonging to a designated link, based on the preset value, a SN of each of to-be-transmitted data frames in the first link is sequentially determined.

In the embodiments of the present disclosure, a designated link may be determined among the at least two links, the designated link is a link in which a minimum value of the SNs of the to-be-transmitted data frames is the value of the SSN, i.e., the SNs of the to-be-transmitted data frames in the designated link is sequentially ordered starting from the SSN.

For example, the at least two links include a link 1 and a link 2, and the preset value is 0. The first link is the link 1, and the link 1 is a designated link. There are five to-be-transmitted data frames in the link 1, and the SNs of the five to-be-transmitted data frames determined in order are 0, 1, 2, 3, and 4, respectively.

At step 402, in response to a second link of the at least two links not belonging to the designated link, a minimum value of SNs of to-be-transmitted data frames in the second link is determined.

In the embodiments of the present disclosure, if the second link does not belong to the designated link, the minimum value of the SNs in the second link may be determined based on the maximum value of the SNs in the other links already determined. In an example, the maximum value of the SNs of the other links may be added by one to obtain the minimum value of the SNs in the second link.

For example, the at least two links include the link 1 and the link 2, and the preset value is 0. The first link is the link 1, and the link is a designated link, and there are five to-be-transmitted data frames in the link 1. The SNs of the five to-be-transmitted data frames determined in order are 0, 1, 2, 3, and 4, respectively. The maximum value of the SNs in the link 1 is 4, then the minimum value of the SNs in the link 2 is 5, i.e., the SSN in the link 2 is 5.

If there is also a link 3, the minimum value of the SNs in the link 3 is 9 when the maximum value of the SNs determined in the link 1 and the link 2 is 8, and so on.

At step 403, based on the minimum value of the SNs, a SN of each of the to-be-transmitted data frames in the second link is sequentially determined.

For example, the second link is the link 2, the minimum value of the SNs in the link 2 is 5, and there are four to-be-transmitted data frames in the link 2, and the SNs of the four to-be-transmitted data frames in the link 2 are 5, 6, 7, and 8, respectively.

For example, the second link is the link 3, the minimum value of the SNs in the link 3 is 9, and the SNs of the four to-be-transmitted data frames in the link 3 are 9, 10, 11, and 12, respectively.

In the embodiments of the present disclosure, the maximum value of the SNs of the to-be-transmitted data frames cannot exceed the buffer size of the request frame for requesting the establishment of the BA mechanism. For example, the buffer size is 15, and the maximum value of the SNs of all to-be-transmitted data frames needs to be less than or equal to 15.

In the embodiments of the present disclosure, the at least two data transmitters may set one SSN for all to-be-transmitted data frames, and a value of the SSN is a preset value, and accordingly, at least two data transmitters may determine the SN of each of the to-be-transmitted data frames in each link based on the SSN. The data receiver may perform BA feedback in accordance with the BA frame structure in the related art, in line with the communication standard development, and the purpose of block acknowledgment feedback based on the MLD-level is achieved.

In some optional embodiments, a value of the SSN of the to-be-transmitted data frames in each of the at least two links between the at least two data transmitters and the same data receiver is a preset value, the preset value may be any integer, including but not limited to 0, 1, −1, etc., and the present disclosure is not limited thereto. That is, there are two or more SSNs, and the number of SSNs is the same as the number of links.

For example, the at least two links include the link 1, the link 2, and the link 3, the number of links is 3, the number of SSNs is also 3, the SSN of the to-be-transmitted data frames in the link 1 is a preset value, and the SSNs of the to-be-transmitted data frames in the link 2 and the link 3 are also the preset value.

Referring to FIG. 5, FIG. 5 is a schematic flowchart illustrating a BA method according to still another exemplary embodiment of the present disclosure, and the method includes the following step 501.

At step 501, based on the preset value, a SN of each of the to-be-transmitted data frames in each of the at least two links is sequentially determined.

For example, the at least two links include the link 1, link 2 and the link 3, the number of SSNs is also three, and the preset value is 0. The number of to-be-transmitted data frames in the link 1 is four, and the SNs of the four to-be-transmitted data frames in the link 1 are 0, 1, 2, 3, respectively. The number of to-be-transmitted data frames in the link 2 is three, and the SNs of the three to-be-transmitted data frames in the link 2 are 0, 1, 2, respectively. The number of to-be-transmitted data frames in the link 3 is five, and the SNs of the five to-be-transmitted data frames in the link 3 are 0, 1, 2, 3, and 4, respectively.

The maximum value of the SNs of all to-be-transmitted data frames cannot exceed the buffer size of the request frame for requesting the establishment of the BA mechanism, and the total number of all to-be-transmitted data frames cannot exceed the buffer size of the request frame for requesting the establishment of the BA mechanism. For example, the buffer size is 15, the maximum value of the SNs of all to-be-transmitted data frames in the link 1, the link 2 and the link 3 cannot exceed 15, and the total number of all to-be-transmitted data frames in the link 1, the link 2 and the link 3 does not exceed 15.

In the embodiments of the present disclosure, the at least two data transmitters may set multiple SSNs for all to-be-transmitted data frames, and a value of each of the SSNs is a preset value, and accordingly, the at least two data transmitters can determine a SN of each of the to-be-transmitted data frames in the respective links of the at least two transmitters based on the SSNs. Similarly, the purpose of BA feedback based on the MLD-level is achieved.

The above embodiments may be performed independently or together with any of the other embodiments of the present disclosure, the embodiments of the present disclosure are not limited hereto.

The BA method provided by the embodiments of the present disclosure is described below from the data receiver again.

Referring to FIG. 6, FIG. 6 is a schematic flowchart illustrating a BA method according to still another exemplary embodiment of the present disclosure, the method can be applied to the data receiver, and include the following steps 601 to 602.

At step 601, in response to receiving all target data frames corresponding to a same traffic identifier by at least two links, target BA frames for BA feedback of all target data frames are determined.

In the embodiments of the present disclosure, the data receiver, after receiving all target data frames, may receive a BA request frame by one of the at least two links, and the BA request frame is configured to request BA feedback from the data receiver.

At step 602, the target BA frames are fed back by one of the at least two links.

In the embodiments of the present disclosure, a terminal feeds back the target BA frames by a link of the at least two links through which the BA request frame is received.

In the above embodiments, the data receiver can feedback the target block acknowledgment frame through one of the links after receiving all the target data frames corresponding to the same TID by at least two links, thereby the purpose of BA feedback based on the MLD-level is achieved, and the efficiency of the feedback is improved.

In some optional embodiments, referring to FIG. 7, FIG. 7 is a schematic flowchart illustrating a BA method according to still another exemplary embodiment of the present disclosure, and the method includes the following steps 701 to 702.

At step 701, a request frame for requesting an establishment of a BA mechanism is received.

In the embodiments of the present disclosure, the data receiver receives the request frame by each of at least two links. In an example, the request frame includes, but is not limited to, an ADDBA request frame.

At step 702, based on a buffer size in the request frame, a maximum value of SNs of the target data frames for BA feedback is determined.

In the embodiments of the present disclosure, the data receiver determines the maximum value of the SNs of the target data frames for BA feedback based on the buffer size negotiated when the BA mechanism was established.

In the above embodiments, the data receiver may determine the maximum value of the SNs of the received target data frames based on the buffer size in the request frame. In this way, the implementation is easy and the availability is high.

In some embodiments, all target data frames received by the data receiver through the at least two links have one SSN, and a value of the SSN is a preset value, which may be any integer, such as 0, 1, etc., and the data receiver may determine the target BA frames according to the structure shown in FIG. 1A.

The above embodiments may be performed independently or together with any of the other embodiments of the present disclosure, the embodiments of the present disclosure are not limited hereto.

Figure 8:
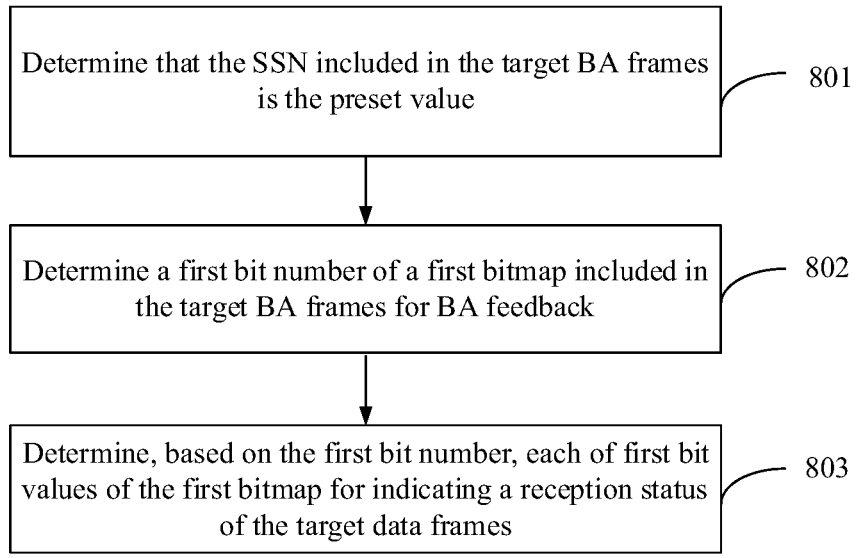
FIG. 8 is a schematic flowchart illustrating a block acknowledgement method according to still another exemplary embodiment of the present disclosure.

Referring to FIG. 8, FIG. 8 is a schematic flowchart illustrating a BA method according to still another exemplary embodiment of the present disclosure, and the method includes the following steps 801 to 802.

At step 801, it is determined that the SSN included in the target BA frames is the preset value.

In the embodiments of the present disclosure, the data receiver may set the SSN included in the target BA frames to the preset value. For example, the preset value is 0, and the SSN in the target BA frames is also set to 0.

At step 802, a first bit number of a first bitmap included in the target BA frames for BA feedback is determined.

In the embodiments of the present disclosure, the first bit number may be the total number of target data frames received by the data receiver.

For example, if the data receiver receives ten target data frames through at least two links, the first bit number of the first bitmap included in the target BA frames is ten.

At step 803, based on the first bit number, each of first bit values of the first bitmap for indicating a reception status of the target data frames is determined.

In the embodiments of the present disclosure, a bit position where each of the first bit values is located corresponds one-to-one to a sequence number of each of the target data frames. For example, a bit position 1 corresponds to a target data frame with a SN of 0. The bit value of the bit position 1 may indicate the reception status of the target data frame with the SN of 0. The bit value of a bit position 2 may indicate the reception status of a target data frame with a SN of 1, and so on.

In an example, a bit value of 1 may be configured to indicate that the reception status of the target data frame is successful, and a bit value of 0 may be configured to indicate that the reception status of the target data frame fails.

For example, the first number is six and the target data frames with SNs of 0, 1, 2, and 5 are successfully received, and the target data frames with SNs of 3 and 4 are not successfully received, thus the first bitmap includes six bit positions and the order of the first bit values of the six bit positions is 1, 1, 1, 0, 0, 1. It is noted that the target data frames with the SNs of 0, 1, 2, and 5 may be the target data frames received through different links in at least two links.

The above is only an exemplary illustration, and other implementations that provide feedback in block acknowledgment frames on the reception status of all target data frames received through at least two links will fall within the scope of protection of the present disclosure.

In the embodiments of the present disclosure, the at least two data transmitters may set one SSN for all to-be-transmitted data frames, and a value of the SSN is a preset value, and accordingly, the at least two data transmitters may determine the SN of each of the to-be-transmitted data frames in each link based on the SSN. The data receiver may perform BA feedback in accordance with the BA frame structure in the related art, in line with the communication standard development, and the purpose of block acknowledgment feedback based on the MLD-level is achieved.

In some embodiments, the SSN of the target data frames in each link received by the data receiver through the at least two links is a preset value, i.e., the SNs of the target data frames received in each link are sequentially arranged starting from the preset value. In the embodiments of the present disclosure, the determined target BA frames need to include at least a link identifier of each link.

The above embodiments may be performed independently or together with any of the other embodiments of the present disclosure, the embodiments of the present disclosure are not limited hereto.

Figure 9:
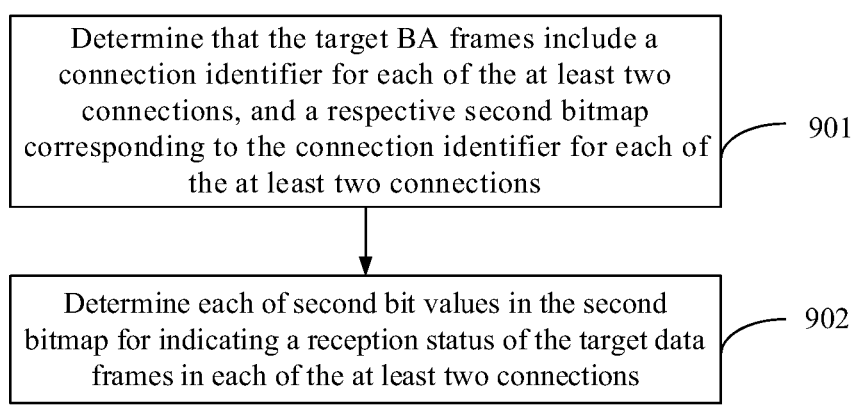
FIG. 9 is a schematic flowchart illustrating a block acknowledgement method according to still another exemplary embodiment of the present disclosure.

Referring to FIG. 9, FIG. 9 is a schematic flowchart illustrating a BA method according to still another exemplary embodiment of the present disclosure, and the method includes the following steps 901 to 902.

At step 901, it is determined that the target BA frames include a link identifier for each of the at least two links, and a respective second bitmap corresponding to the link identifier for each of the at least two links is determined.

For example, the at least two links include the link 1 and the link 2, and the number of second bitmaps is also two, with the link 1 corresponding to the second bitmap 1 and the link 2 corresponding to the second bitmap 2.

At step 902, each of second bit values in the second bitmap for indicating a reception status of the target data frames in each of the at least two links is determined.

In the embodiments of the present disclosure, a bit position where each of the second bit values is located corresponds one-to-one to a SN of each of the target data frames received in each of the at least two links.

For example, the number of target data frames received in the link 1 is four, and there are four bit positions included in the second bitmap 1 corresponding to the link 1 for indicating the reception status of each of the four target data frames in the link 1.

In an example, a bit value of 1 may be used to indicate that the reception status of the target data frame is success, and a bit value of 0 may be configured to indicate that the reception status of the target data frame is a failure.

For example, in the link 1, the target data frames with the SNs of 0 and 1 are successfully received and the target data frames with the SNs of 2 and 3 are not successfully received. The second bitmap 1 corresponding to the link 1 includes four bit positions, and the second bit values of the four bit positions are in the order of 1, 1, 0, and 0.

In the embodiments of the present disclosure, the at least two data transmitters may set multiple SSNs for the to-be-transmitted data frames, and a value of each of the SSNs is a preset value, and accordingly, the at least two data transmitters can determine a SN of each of the to-be-transmitted data frames in the respective links of the at least two transmitters based on the SSNs. Similarly, the purpose of BA feedback based on the MLD-level is achieved.

The above embodiments may be performed independently or together with any of the other embodiments of the present disclosure, the embodiments of the present disclosure are not limited hereto.

Figure 10:
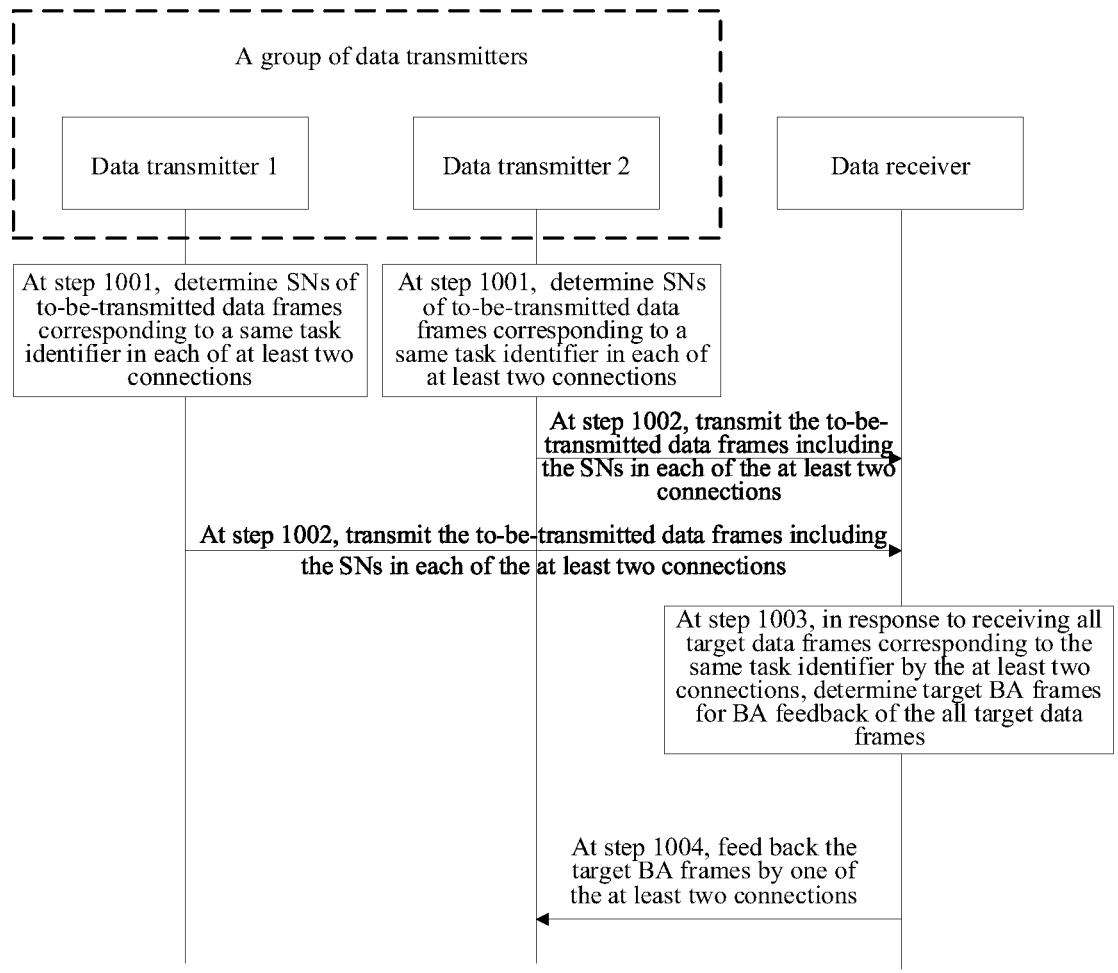
FIG. 10 is a schematic flowchart illustrating a block acknowledgement method according to still another exemplary embodiment of the present disclosure.

In some embodiments, referring to FIG. 10, FIG. 10 is a schematic flowchart illustrating a BA method according to still another exemplary embodiment of the present disclosure, and the method includes the following steps 1001 to 1004.

At step 1001, a group of data transmitters including at least two data transmitters determines SNs of to-be-transmitted data frames corresponding to a same traffic identifier in each of at least two links.

The at least two links include links between each of the at least two data transmitters and the same data receiver. Two data transmitters are illustrated in FIG. 10 as an example, and more data transmitters may be included in applications.

All to-be-transmitted data frames in the at least two links have one SSN, and a value of the SSN is a preset value. If a first link of the at least two links belongs to a designated link, a SN of each of the to-be-transmitted data frames in the first link is determined sequentially based on the preset value, and a second link of the at least two links does not belong to the designated link, a minimum value of SNs of the to-be-transmitted data frames in the second link is determined, and further, a SN of each of the to-be-transmitted data frames in the second link is determined sequentially based on the minimum value of SNs.

At step 1002, the at least two data transmitters transmit the to-be-transmitted data frames including the SNs in each of the at least two links.

At step 1003, the data receiver, in response to receiving all target data frames corresponding to the same traffic identifier by the at least two links, determines target BA frames for BA feedback of all target data frames.

In an embodiment of the present disclosure, the structure of the target BA frame is shown in FIG. 1A. A SSN included in the target BA frames is the preset value as described, the target BA frames includes a first bitmap, and each of the first bit values of the first bitmap is configured to indicate a reception status of the target data frames.

At step 1004, the target BA frames are fed back by one of the at least two links.

In the embodiments of the present disclosure, the at least two data transmitters may set one SSN for all to-be-transmitted data frames, and a value of the SSN is a preset value, and accordingly, at least two data transmitters may determine the SN of each of the to-be-transmitted data frames in each link based on the SSN. The data receiver may perform BA feedback in accordance with the BA frame structure in the related art, in line with the communication standard development, and the purpose of block acknowledgment feedback based on the MLD-level is achieved.

In the embodiments of the present disclosure, the at least two data transmitters may set multiple SSNs for the to-be-transmitted data frames, and a value of each of the SSNs is a preset value, and accordingly, the at least two data transmitters can determine a SN of each of the to-be-transmitted data frames in the respective links of the at least two transmitters based on the SSNs. Similarly, the purpose of BA feedback based on the MLD-level is achieved.

The above embodiments may be performed independently or together with any of the other embodiments of the present disclosure, the embodiments of the present disclosure are not limited hereto.

Corresponding to the embodiments of the method for implementing the application function, the present disclosure also provides embodiments of an apparatus for implementing the application function.

Figure 11:
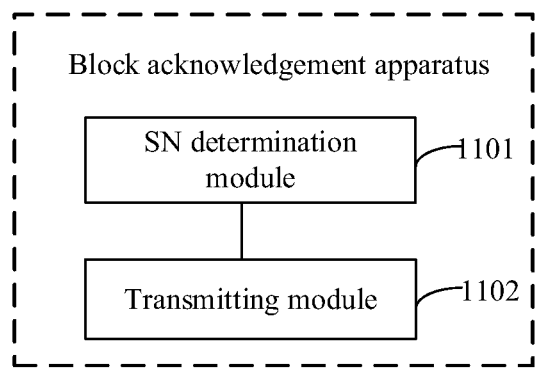
FIG. 11 is a structural block diagram illustrating a block acknowledgement apparatus according to an exemplary embodiment of the present disclosure.

Referring to FIG. 11, FIG. 11 is a structural block diagram illustrating a block acknowledgement apparatus according to an exemplary embodiment of the present disclosure, the apparatus is applied to at least two data transmitters, and include:
- a SN determination module 1101, configured to determine SNs of to-be-transmitted data frames corresponding to the same traffic identifier in each of at least two links, where the at least two links include links between each of the at least two data transmitters and a same data receiver; and
- a transmitting module 1102, configured to transmit the to-be-transmitted data frames including the SNs in each of the at least two links.

Figure 12:
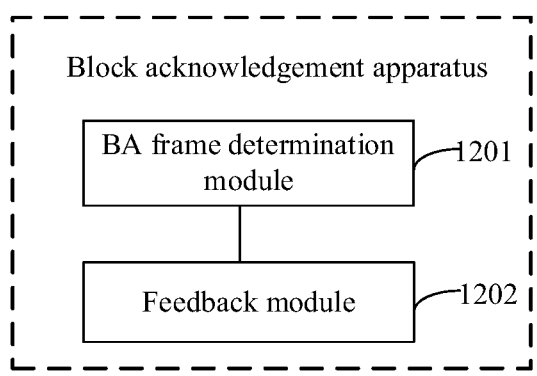
FIG. 12 is a structural block diagram illustrating a block acknowledgement apparatus according to another exemplary embodiment of the present disclosure.

Referring to FIG. 12, FIG. 12 is a structural block diagram illustrating a block acknowledgement apparatus according to another exemplary embodiment of the present disclosure, the apparatus is applied to a data receiver, and includes:
- a BA frame determination module 1201, configured to, in response to receiving all target data frames corresponding to a same traffic identifier by at least two links, determine target block acknowledgement frames for block acknowledgement feedback of all target data frames, where the at least two links include links between each of the at least two data transmitters and the data receiver; and
- a feedback module 1202, configured to feed back the target block acknowledgement frames by one of the at least two links.

Since embodiments of the device substantially corresponds to embodiments of the method, relevant parts may be referred to the description of the embodiments of the method. The embodiments of the device described above are merely schematic, where the units described as separate components may or may not be physically separate, and the components displayed as units may or may not be physical units, i.e., the components displayed as units may be located in one place or distributed to a plurality of network units. Some or all of these modules can be selected according to actual needs to achieve the purpose of the solution of the present disclosure. It may be understood and implemented by those skilled in the art without creative work.

Correspondingly, the present disclosure further provides a computer readable storage medium storing computer programs, where the programs, when executed by a processor, cause the processor to perform the block acknowledgment method applied to at least two data transmitters.

Correspondingly, the present disclosure further provides a computer readable storage medium storing computer programs, where the programs, when executed by a processor, cause the processor to perform the block acknowledgment method applied to a data receiver.

Correspondingly, the present disclosure further provides a block acknowledgement device, including:
- a processor; and
- a memory storing instructions executable by the processor,
- where the processor is configured to perform the block acknowledgment method applied to at least two data transmitters.

Correspondingly, the present disclosure further provides a block acknowledgement device, including:
- a processor; and
- a memory storing instructions executable by the processor,
- where the processor is configured to perform the block acknowledgment method applied to a data receiver.

In some embodiments, a block acknowledgment method is provided, applied to at least two data transmitters, and comprises: determining sequence numbers of to-be-transmitted data frames corresponding to a same traffic identifier in each of at least two links, wherein the at least two links comprise links between each of the at least two data transmitters and a same data receiver; and transmitting the to-be-transmitted data frames comprising the sequence numbers in each of the at least two links.

In some embodiments, the method further comprises, before determining the sequence numbers of the to-be-transmitted data frames corresponding to the same traffic identifier in each of the at least two links: transmitting a request frame for requesting an establishment of a block acknowledgment mechanism; and determining, based on a buffer size in the request frame, a maximum value of the sequence numbers of all to-be-transmitted data frames in the at least two links.

In some embodiments, all to-be-transmitted data frames in the at least two links have one starting sequence number, and a value of the starting sequence number is a preset value; determining the sequence numbers of the to-be-transmitted data frames corresponding to the same traffic identifier in each of the at least two links comprises: determining that a first link of the at least two links belongs to a designated link, and sequentially determining, based on the preset value, a sequence number of each of to-be-transmitted data frames in the first link, wherein the designated link is one of the at least two links in which a minimum value of sequence numbers of to-be-transmitted data frames is the value of the starting sequence number; and determining that a second link of the at least two links does not belong to the designated link, determining a minimum value of sequence numbers of to-be-transmitted data frames in the second link, and sequentially determining, based on the minimum value of the sequence numbers, a sequence number of each of the to-be-transmitted data frames in the second link.

In some embodiments, determining the minimum value of the sequence numbers of the to-be-transmitted data frames in the second link comprises: determining, based on a maximum value of sequence numbers determined in other links of the at least two links than the second link, the minimum value of the sequence numbers of the to-be-transmitted data frames in the second link.

In some embodiments, for each of the at least two links, a value of a starting sequence number of to-be-transmitted data frames in the link is a preset value; determining the sequence numbers of the to-be-transmitted data frames corresponding to the same traffic identifier in each of at least two links comprises: for each of the at least two links, sequentially determining, based on the preset value, a sequence number of each to-be-transmitted data frame in the link.

In some embodiments, a block acknowledgement method is provided, applied to a data receiver, and comprises: receiving all target data frames corresponding to a same traffic identifier by at least two links; determining target block acknowledgement frames for block acknowledgement feedback of all target data frames, wherein the at least two links comprise links between each of at least two data transmitters and the data receiver; and feeding back the target block acknowledgement frames by one of the at least two links.

In some embodiments, the method further comprises: receiving a request frame for requesting an establishment of a block acknowledgment mechanism; and determining, based on a buffer size in the request frame, a maximum value of sequence numbers of the target data frames for block acknowledgement feedback.

In some embodiments, all target data frames have one starting sequence number, and a value of the starting sequence number is a preset value; determining the target block acknowledgement frames for block acknowledgement feedback of all target data frames comprises: determining that a value of a starting sequence number comprised in the target block acknowledgement frames is the preset value; determining a first bit number of a first bitmap comprised in the target block acknowledgement frames for block acknowledgement feedback; and determining, based on the first bit number, each of first bit values of the first bitmap for indicating a reception status of the target data frames, wherein a bit position where each of the first bit values is located corresponds one-to-one to a sequence number of each of the target data frames.

In some embodiments, a value of a starting sequence number of target data frames in each of the at least two links is a preset value; determining the target block acknowledgement frames for block acknowledgement feedback of all target data frames comprises: determining that the target block acknowledgement frames comprise a link identifier for each of the at least two links, and a respective second bitmap corresponding to the link identifier for each of the at least two links; and determining each of second bit values in the second bitmap for indicating a reception status of the target data frames in each of the at least two links, wherein a bit position where each of the second bit values is located corresponds one-to-one to a sequence number of each of the target data frames received in each of the at least two links.

In some embodiments, a block acknowledgement apparatus is provided, applied to at least two data transmitters, and comprises: a sequence number determination module, configured to determine sequence numbers of to-be-transmitted data frames corresponding to a same traffic identifier in each of at least two links, wherein the at least two links comprise links between each of the at least two data transmitters and a same data receiver; and a transmitting module, configured to transmit the to-be-transmitted data frames comprising the sequence numbers in each of the at least two links.

In some embodiments, a block acknowledgement apparatus is provided, applied to a data receiver, and comprises: a block acknowledgement frame determination module, configured to, in response to receiving all target data frames corresponding to a same traffic identifier by at least two links, determine target block acknowledgement frames for block acknowledgement feedback of all target data frames, wherein the at least two links comprise links between each of at least two data transmitters and the data receiver; and a feedback module, configured to feed back the target block acknowledgement frames by one of the at least two links.

In some embodiments, a computer-readable storage medium storing computer programs thereon is provided, wherein the programs, when executed by a processor, cause the processor to perform the above-mentioned block acknowledgement method.

In some embodiments, a computer readable storage medium storing computer programs thereon is provided, wherein the programs, when executed by a processor, cause the processor to perform the above-mentioned block acknowledgement method.

In some embodiments, a block acknowledgement device is provided, and comprises: a processor; and a memory storing instructions executable by the processor, wherein the processor is configured to perform the above-mentioned block acknowledgement method.

In some embodiments, a block acknowledgement device is provided, and comprises: a processor; and a memory storing instructions executable by the processor, wherein the processor is configured to perform the above-mentioned block acknowledgement method.

In some embodiments, a block acknowledgement method is provided, and comprises: determining, by at least two data transmitters, sequence numbers of to-be-transmitted data frames corresponding to a same traffic identifier in each of at least two links; transmitting, by the at least two data transmitters, the to-be-transmitted data frames comprising the sequence numbers in each of the at least two links to a data receiver; receiving by the data receiver, through the at least two links, all target data frames corresponding to the same traffic identifier from the at least two data transmitters; determining, by the data receiver, target block acknowledgement frames for block acknowledgement feedback of all target data frames, wherein the at least two links comprise links between each of the at least two data transmitters and the data receiver; and feeding back, by the data receiver, the target block acknowledgement frames by one of the at least two links.

In some embodiments, the method further comprises, before determining, by the at least two data transmitters, the sequence numbers of the to-be-transmitted data frames corresponding to the same traffic identifier in each of the at least two links: transmitting, by the at least two data transmitters, a request frame for requesting an establishment of a block acknowledgment mechanism; and determining by the at least two data transmitters, based on a buffer size in the request frame, a maximum value of the sequence numbers of all to-be-transmitted data frames in the at least two links.

In some embodiments, all to-be-transmitted data frames in the at least two links have one starting sequence number, and a value of the starting sequence number is a preset value; determining, by the at least two data transmitters, the sequence numbers of the to-be-transmitted data frames corresponding to the same traffic identifier in each of the at least two links comprises: determining, by the at least two data transmitters, that a first link of the at least two links belongs to a designated link, and sequentially determining by the at least two data transmitters, based on the preset value, a sequence number of each of to-be-transmitted data frames in the first link, wherein the designated link is one of the at least two links in which a minimum value of sequence numbers of to-be-transmitted data frames is the value of the starting sequence number; determining, by the at least two data transmitters, that a second link of the at least two links does not belong to the designated link, and determining, by the at least two data transmitters, a minimum value of sequence numbers of to-be-transmitted data frames in the second link; and sequentially determining by the at least two data transmitters, based on the minimum value of the sequence numbers, a sequence number of each of the to-be-transmitted data frames in the second link.

In some embodiments, determining, by the at least two data transmitters, the minimum value of the sequence numbers of the to-be-transmitted data frames in the second link comprises: determining by the at least two data transmitters, based on a maximum value of sequence numbers determined in other links of the at least two links than the second link, the minimum value of the sequence numbers of the to-be-transmitted data frames in the second link.

In some embodiments, for each of the at least two links, a value of a starting sequence number of to-be-transmitted data frames in the link is a preset value; determining, by the at least two data transmitters, the sequence numbers of the to-be-transmitted data frames corresponding to the same traffic identifier in each of at least two links comprises: for each of the at least two links, sequentially determining by the at least two data transmitters, based on the preset value, a sequence number of each to-be-transmitted data frame in the link.

In some embodiments, the method further comprises: receiving, by the data receiver, a request frame for requesting an establishment of a block acknowledgment mechanism; and
determining by the data receiver, based on a buffer size in the request frame, a maximum value of sequence numbers of the target data frames for block acknowledgement feedback.

In some embodiments, all target data frames have one starting sequence number, and a value of the starting sequence number is a preset value; determining, by the data receiver, the target block acknowledgement frames for block acknowledgement feedback of all target data frames comprises: determining, by the data receiver, that a value of a starting sequence number comprised in the target block acknowledgement frames is the preset value; determining, by the data receiver, a first bit number of a first bitmap comprised in the target block acknowledgement frames for block acknowledgement feedback; and determining by the data receiver, based on the first bit number, each of first bit values of the first bitmap for indicating a reception status of the target data frames, wherein a bit position where each of the first bit values is located corresponds one-to-one to a sequence number of each of the target data frames.

In some embodiments, a value of a starting sequence number of target data frames in each of the at least two links is a preset value; determining, by the data receiver, the target block acknowledgement frames for block acknowledgement feedback of all target data frames comprises: determining, by the data receiver, that the target block acknowledgement frames comprise a link identifier for each of the at least two links, and a respective second bitmap corresponding to the link identifier for each of the at least two links; and determining, by the data receiver, each of second bit values in the second bitmap for indicating a reception status of the target data frames in each of the at least two links, wherein a bit position where each of the second bit values is located corresponds one-to-one to a sequence number of each of the target data frames received in each of the at least two links.

Embodiments of the present disclosure provide technical solutions that may include the following beneficial effects.

In the embodiments of the present disclosure, the at least two data transmitters may determine determining sequence numbers of to-be-transmitted data frames corresponding to a same traffic identifier in each of at least two links, thereby transmit the to-be-transmitted data frames including the sequence numbers in each of the at least two links, so that the data receiver determines target block acknowledgment frames to achieve block acknowledgment feedback based on MLD-level, and the feedback efficiency is improved.

In the embodiments of the present disclosure, the at least two data transmitters may, before determining the sequence numbers of the to-be-transmitted data frames corresponding to the same traffic identifier in each of the at least two links, transmit a request frame for requesting an establishment of a block acknowledgment mechanism, and determine, based on a buffer size in the request frame, a maximum value of the sequence numbers of all to-be-transmitted data frames in the at least two links. The data receiver can determine the maximum value of the sequence numbers of the received target data frames based on the buffer size in the request frame. In this way, the implementation is easy and the availability is high.

In the embodiments of the present disclosure, the at least two data transmitters may set one starting sequence number for all to-be-transmitted data frames, and a value of the starting sequence number is a preset value, and accordingly, at least two data transmitters may determine the sequence number of each of the to-be-transmitted data frames in each link based on the starting sequence number. The data receiver may perform block acknowledgment feedback in accordance with the block acknowledgment frame structure in the related art, in line with the communication standard development, and the purpose of block acknowledgment feedback based on the MLD-level is achieved.

In the embodiments of the present disclosure, the at least two data transmitters may set multiple starting sequence numbers for the to-be-transmitted data frames, and a value of each of the starting sequence numbers is a preset value, and accordingly, the at least two data transmitters can determine a sequence number of each of the to-be-transmitted data frames in the respective links of the at least two transmitters based on the starting sequence numbers. Similarly, the purpose of block acknowledgment feedback based on the MLD-level is achieved.

After considering the specification and practicing the present disclosure, a person skilled in the art would easily conceive of other implementations of the present disclosure. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise construction described herein and shown in the drawings, and that various modifications and changes may be made without departing from the scope thereof. The scope of the disclosure is to be limited only by the appended claims.

The invention claimed is:

1. A method for block acknowledgement feedback of data frames, performed by at least two data transmitters, comprising:
determining sequence numbers of to-be-transmitted data frames corresponding to a same traffic identifier in each of at least two links, wherein the at least two links comprise links between each of the at least two data transmitters and a same data receiver; and
transmitting the to-be-transmitted data frames comprising the sequence numbers in each of the at least two links.

2. The method of claim 1, further comprising, before determining the sequence numbers of the to-be-transmitted data frames corresponding to the same traffic identifier in each of the at least two links:
transmitting a request frame for requesting an establishment of a block acknowledgment mechanism; and
determining, based on a buffer size in the request frame, a maximum value of the sequence numbers of all of the to-be-transmitted data frames in the at least two links.

3. The method of claim 1, wherein all of the to-be-transmitted data frames in the at least two links have one starting sequence number, and a value of the starting sequence number is a preset value;

determining the sequence numbers of the to-be-transmitted data frames corresponding to the same traffic identifier in each of the at least two links comprises:
  determining that a first link of the at least two links belongs to a designated link, and sequentially determining, based on the preset value, a sequence number of each of to-be-transmitted data frames in the first link, wherein the designated link is one of the at least two links in which a minimum value of sequence numbers of the to-be-transmitted data frames is the value of the starting sequence number; and
  determining that a second link of the at least two links does not belong to the designated link, and determining a minimum value of sequence numbers of the to-be-transmitted data frames in the second link; and
  sequentially determining, based on the minimum value of the sequence numbers, a sequence number of each of the to-be-transmitted data frames in the second link.

4. The method of claim 3, wherein determining the minimum value of the sequence numbers of the to-be-transmitted data frames in the second link comprises:
  determining, based on a maximum value of sequence numbers determined in other links of the at least two links than the second link, the minimum value of the sequence numbers of the to-be-transmitted data frames in the second link.

5. The method of claim 1, wherein for each of the at least two links, a value of a starting sequence number of the to-be-transmitted data frames in a respective link is a preset value;
  determining the sequence numbers of the to-be-transmitted data frames corresponding to the same traffic identifier in each of the at least two links comprises:
  for each of the at least two links, sequentially determining, based on the preset value, a sequence number of each the to-be-transmitted data frames in the respective link.

6. A device for block acknowledgement feedback of data frames, comprising:
  a processor; and
  a non-transitory memory storing instructions executable by the processor,
  wherein the processor is configured to perform the method of claim 1.

7. A method for block acknowledgement feedback of data frames, performed by a data receiver, comprising:
  receiving all target data frames corresponding to a same traffic identifier from at least two links;
  determining target block acknowledgement frames for block acknowledgement feedback of all of the target data frames, wherein the at least two links comprise links between each of at least two data transmitters and the data receiver; and
  feeding back the target block acknowledgement frames by one of the at least two links.

8. The method of claim 7, further comprising:
  receiving a request frame for requesting an establishment of a block acknowledgment mechanism; and
  determining, based on a buffer size in the request frame, a maximum value of sequence numbers of the target data frames for block acknowledgement feedback.

9. The method of claim 7, wherein all of the target data frames have one starting sequence number, and a value of the starting sequence number is a preset value;
  determining the target block acknowledgement frames for block acknowledgement feedback of all of the target data frames comprises:

determining that a value of a starting sequence number comprised in the target block acknowledgement frames is the preset value;
  determining a first bit number of a first bitmap comprised in the target block acknowledgement frames for block acknowledgement feedback; and
  determining, based on the first bit number, each of first bit values of the first bitmap for indicating a reception status of the target data frames, wherein a bit position where each of the first bit values is located corresponds one-to-one to a sequence number of each of the target data frames.

10. The method of claim 7, wherein a value of a starting sequence number of the target data frames in each of the at least two links is a preset value;
  determining the target block acknowledgement frames for block acknowledgement feedback of all of the target data frames comprises:
  determining that the target block acknowledgement frames comprise a link identifier for each of the at least two links, and a respective second bitmap corresponding to the link identifier for each of the at least two links; and
  determining each of second bit values in the respective second bitmap for indicating a reception status of the target data frames in each of the at least two links, wherein a bit position where each of the second bit values is located corresponds one-to-one to a sequence number of each of the target data frames received in each of the at least two links.

11. A non-transitory computer readable storage medium, storing computer programs thereon, wherein the computer programs, when executed by a processor, cause the processor to perform the method of claim 7.

12. A device for block acknowledgement feedback of data frames, comprising:
  a processor; and
  a non-transitory memory storing instructions executable by the processor,
  wherein the processor is configured to perform the method of claim 7.

13. A method for block acknowledgement feedback of data frames, comprising:
  determining, by at least two data transmitters, sequence numbers of to-be-transmitted data frames corresponding to a same traffic identifier in each of at least two links;
  transmitting, by the at least two data transmitters, the to-be-transmitted data frames comprising the sequence numbers in each of the at least two links to a data receiver;
  receiving by the data receiver, through the at least two links, all target data frames corresponding to the same traffic identifier from the at least two data transmitters;
  determining, by the data receiver, target block acknowledgement frames for block acknowledgement feedback of all of the target data frames, wherein the at least two links comprise links between each of the at least two data transmitters and the data receiver; and
  feeding back, by the data receiver, the target block acknowledgement frames by one of the at least two links.

14. The method of claim 13, further comprising, before determining, by the at least two data transmitters, the sequence numbers of the to-be-transmitted data frames corresponding to the same traffic identifier in each of the at least two links:

transmitting, by the at least two data transmitters, a request frame for requesting an establishment of a block acknowledgment mechanism; and determining by the at least two data transmitters, based on a buffer size in the request frame, a maximum value of the sequence numbers of all of the to-be-transmitted data frames in the at least two links.

15. The method of claim 13, wherein all of the to-be-transmitted data frames in the at least two links have one starting sequence number, and a value of the starting sequence number is a preset value;

determining, by the at least two data transmitters, the sequence numbers of the to-be-transmitted data frames corresponding to the same traffic identifier in each of the at least two links comprises:

determining, by the at least two data transmitters, that a first link of the at least two links belongs to a designated link, and sequentially determining by the at least two data transmitters, based on the preset value, a sequence number of each of to-be-transmitted data frames in the first link, wherein the designated link is one of the at least two links in which a minimum value of sequence numbers of the to-be-transmitted data frames is the value of the starting sequence number;

determining, by the at least two data transmitters, that a second link of the at least two links does not belong to the designated link, and determining, by the at least two data transmitters, a minimum value of sequence numbers of the to-be-transmitted data frames in the second link; and sequentially determining by the at least two data transmitters, based on the minimum value of the sequence numbers, a sequence number of each of the to-be-transmitted data frames in the second link.

16. The method of claim 15, wherein determining, by the at least two data transmitters, the minimum value of the sequence numbers of the to-be-transmitted data frames in the second link comprises:

determining by the at least two data transmitters, based on a maximum value of sequence numbers determined in other links of the at least two links than the second link, the minimum value of the sequence numbers of the to-be-transmitted data frames in the second link.

17. The method of claim 13, wherein for each of the at least two links, a value of a starting sequence number of the to-be-transmitted data frames in a respective link is a preset value;

determining, by the at least two data transmitters, the sequence numbers of the to-be-transmitted data frames corresponding to the same traffic identifier in each of at least two links comprises:

for each of the at least two links, sequentially determining by the at least two data transmitters, based on the preset value, a sequence number of each of the to-be-transmitted data frames in the link.

18. The method of claim 13, further comprising:

receiving, by the data receiver, a request frame for requesting an establishment of a block acknowledgment mechanism; and determining by the data receiver, based on a buffer size in the request frame, a maximum value of sequence numbers of the target data frames for block acknowledgement feedback.

19. The method of claim 13, wherein all of the target data frames have one starting sequence number, and a value of the starting sequence number is a preset value;

determining, by the data receiver, the target block acknowledgement frames for block acknowledgement feedback of all of the target data frames comprises:

determining, by the data receiver, that a value of a starting sequence number comprised in the target block acknowledgement frames is the preset value;

determining, by the data receiver, a first bit number of a first bitmap comprised in the target block acknowledgement frames for block acknowledgement feedback; and determining by the data receiver, based on the first bit number, each of first bit values of the first bitmap for indicating a reception status of the target data frames, wherein a bit position where each of the first bit values is located corresponds one-to-one to a sequence number of each of the target data frames.

20. The method of claim 13, wherein a value of a starting sequence number of the target data frames in each of the at least two links is a preset value;

determining, by the data receiver, the target block acknowledgement frames for block acknowledgement feedback of all of the target data frames comprises:

determining, by the data receiver, that the target block acknowledgement frames comprise a link identifier for each of the at least two links, and a respective second bitmap corresponding to the link identifier for each of the at least two links; and determining, by the data receiver, each of second bit values in the respective second bitmap for indicating a reception status of the target data frames in each of the at least two links, wherein a bit position where each of the second bit values is located corresponds one-to-one to a sequence number of each of the target data frames received in each of the at least two links.

* * * * *